US008793488B1

(12) United States Patent
Forristal

(10) Patent No.: US 8,793,488 B1
(45) Date of Patent: Jul. 29, 2014

(54) DETECTION OF EMBEDDED RESOURCE LOCATION DATA

(75) Inventor: Jeff Forristal, Elizabethton, TN (US)

(73) Assignee: Zscaler, Inc., San Jose, CA (US)

( * ) Notice: Subject to any disclaimer, the term of this patent is extended or adjusted under 35 U.S.C. 154(b) by 1524 days.

(21) Appl. No.: 12/173,067

(22) Filed: Jul. 15, 2008

(51) Int. Cl.
*H04L 9/08* (2006.01)

(52) U.S. Cl.
USPC .............................. 713/162; 709/201; 725/112

(58) Field of Classification Search
None
See application file for complete search history.

(56) References Cited

U.S. PATENT DOCUMENTS

| 2006/0031404 | A1 | 2/2006 | Kassab | |
|---|---|---|---|---|
| 2006/0236225 | A1* | 10/2006 | Achilles et al. | 715/513 |
| 2007/0261112 | A1 | 11/2007 | Todd et al. | |
| 2008/0104688 | A1 | 5/2008 | Paskett et al. | |
| 2009/0013087 | A1* | 1/2009 | Lorch et al. | 709/232 |

OTHER PUBLICATIONS

Bowen, C. et al., "InformIT: Essential Windows Communication Foundation for .NET Framework 3.5: Programmable Web". Feb. 8, 2008. Retrieved from the internet: <http://www.informit.com/articles/article.aspx?p=1173045&seqNum-2>. Retrieved Jul. 14, 2008.
HTML 5 letter section. 2.3 URLs, pp. 29-36. Retrieved from the internet: <http://www.whatwg.org/specs/web-apps/current-work/htm15-letter.pdf.>. Retrieved Jul. 14, 2008.
Anonymous Proxy Controls for Business. CYMPHONIX Smart Network, Smart Business. Retrieved from the internet: <http://www.cymphonix.com/SMBAnonymousProxies.html>. Retrieved Jul. 14, 2008.
dans.blog: CFMX UDF: Parsing a URI into a struct . . . Retrieved from the internet: <http://blog.pengoworks.com/index.cfm/2006/9/27/CFMX-UDF-Parsing-a-URI-into-a-struct>. Retrieved Jul. 14, 2008.

* cited by examiner

*Primary Examiner* — Edward Zee
*Assistant Examiner* — Leynna Truvan
(74) *Attorney, Agent, or Firm* — Clements Bernard PLLC; Christopher L. Bernard; Lawrence A. Baratta, Jr.

(57) ABSTRACT

Systems, methods and apparatus for a distributed security that detects embedded resource request identifiers. The system can identify requests, such as HTTP requests, and can identify encoded prefix data corresponding to URI prefixes, such as Base64 or Base16 encoded URI prefixes "www." and "http:".

22 Claims, 6 Drawing Sheets

DETECTION OF EMBEDDED RESOURCE LOCATION DATA

CROSS-REFERENCE TO RELATED APPLICATION

This application is related to U.S. patent application Ser. No. 12/173,099, filed on Jul. 15, 2008 (now U.S. Pat. No. 8,230,506 issued Jul. 23, 2012), and entitled "Proxy Communication Detection," the entire disclosure of which is incorporated herein by reference.

BACKGROUND

This disclosure relates to security provisioning.

The prevalence and accessibility of computer networks requires security measures to protect valuable information and to ensure that users of the computer networks are using network resources in accordance with one or more security and usage policies. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

Such layered security systems are prone to processing inefficiencies and can require many resources within the enterprise to maintain the systems. For example, many layered security systems do not implement a distribution infrastructure to communicate and share content intelligence. This results in repeated processing of both good and bad content. Many layered security systems also cannot readily maintain a central data store of threat data that classifies content items such as files, uniform resource locators (URLs), e-mails according to security classifications (e.g. virus, malware, spam mail, etc.).

Additionally, generating a consolidated security view of the enterprise is a difficult process, as this requires the collecting of data from different locations and user groups and arranging the data in a common time order before abstracting and generating reports. Due to disparity in the security products across locations, there is difficulty in capturing the information into a common format Finally, many of the existing security solutions have limited real-time or data mining capabilities. In particular, many of the existing security solutions have limited capabilities for detecting potentially surreptitious activities of users. For example, an entity, such as an enterprise, may define a list of prohibited resource locations, e.g., a list of prohibited URLs. However, users can attempt to access the prohibited resource locations by use of anonymous proxy servers. Such proxy servers service the requests of their clients by forwarding requests to other servers, such as the servers that are prohibited by the enterprise. Thus, by using a proxy server, a user can access prohibited web sites.

Some security systems can access a list of know proxy servers, e.g., a list of IP addresses associated with proxy servers, or the URLs of the proxy servers, and block HTTP requests and responses from the proxy servers. However, there may be legitimate uses for the proxy servers, and thus this approach imposes an additional cost of eliminating the use of proxy servers. Furthermore, new proxy servers may appear or an address associated with an existing proxy server can change, and thus maintaining a list of all proxy servers for blocking capabilities is time consuming and expensive, and often not possible.

Adding to the complexity is the encoding of resource location data. Many common schemes are used to encode data, such as Base16, Base32 and Base64 data encodings, which are specified in RFC 4648. Such base encoding of data is used to store or transfer data in environments that, usually for legacy reasons, are restricted to US-ASCII data, or because the encoding makes it possible to manipulate particular objects with text editors. The encoding of resource data, however, can effectively disguise a prohibited resource location. For example, the URL "www.example.com" encoded in Base64 is "d3d3LmV4YW1wbGUuY29t". Identifying and decoding all encoded data can be time consuming and resource prohibitive, and thus prohibited resource locations can be accessed by their encoded variant.

SUMMARY

In general, one aspect of the subject matter described in this specification can be embodied in methods that include the following actions in a processing node or a logging node: identifying resource requests external to addressed receiving devices and addressed transmitting devices of the resource requests; for each of the identified resource requests: determining if the resource request include one of a plurality of predetermined encoded prefix data, each of the predetermined encoded prefix data being indicative of prefix data of an embedded resource request; if the resource request is determined to include one of the plurality of predetermined encoded prefix data, then decoding the encoded prefix data and encoded subsequent data that is contiguous with the encoded prefix data and encoded according to an encoding scheme of the encoded prefix data; determining if the decoded prefix data and subsequent data comprises an embedded resource request identifier; and if the decoded prefix data and subsequent data comprises an embedded resource request identifier, then generating a security notification to instantiate a security process responsive to the embedded resource request identifier. Other implementations of this aspect include corresponding systems, apparatus, and computer program products.

Another aspect of the subject matter described in this specification can be embodied in methods that include the following actions in a processing node: identifying resource requests external to addressed receiving devices and addressed transmitting devices of the resource requests; for each of the identified resource requests, determining if the resource request includes an embedded resource request identifier; if the resource request includes an embedded resource request identifier, then classifying the embedded resource request identifier according to a security policy associated with a device to which the resource request is addressed; and performing a filtering operation in response to the embedded resource request identifier, the filtering operation being based on the classification of the embedded resource request identifier. Other implementations of this aspect include corresponding systems, apparatus, and computer program products.

The subject matter described in this specification also includes other aspects. Additionally, one or more of the following advantages can be realized by implementations of the subject matter described in this specification. Embedded resource request identifiers, e.g., uniform resource locators, can be detected by an encoding prefix signature. Only data beginning with the encoding prefix signature are decoded, thus saving processing resources. The decoded resource request identifiers can be compared to a security policy and corresponding filtering operations can be enforced, if necessary. Furthermore, the use of services that embed resource request identifiers and, optionally encode such identifiers, need not be tracked or prohibited. Thus, users may utilize these services, such as anonymous proxy servers, for legitimate uses.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
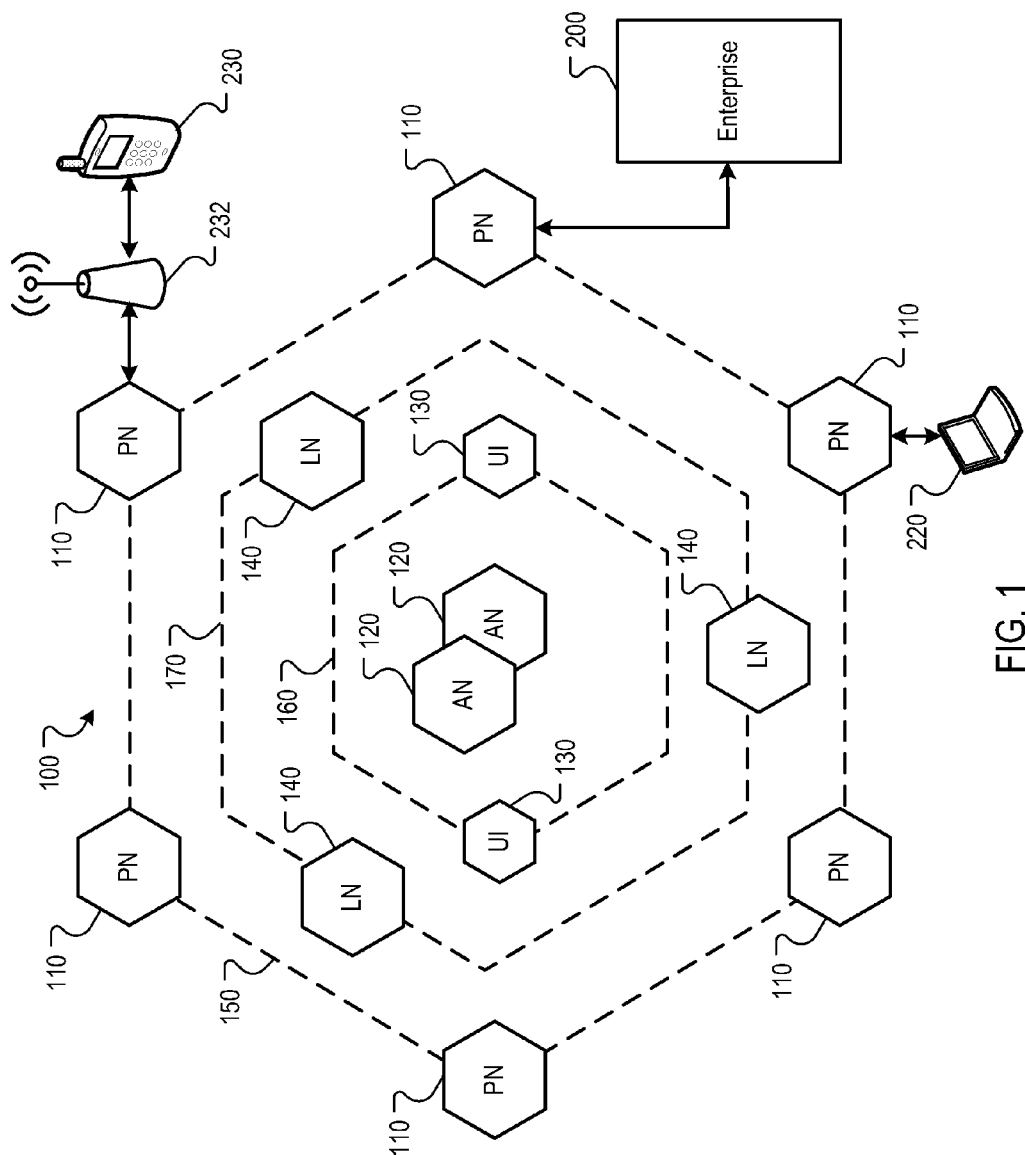
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can identify a threat classification, e.g., clean, spyware, malware, undesirable content, innocuous, unknown, etc. for content. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communicate to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can be implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system. Each logging node 140 can perform various statistical operations and data mining on the stored data, such as analyzing web traffic for an enterprise 200, computer device 220, and/or mobile device 230.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes. For example, a browser may be configured to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), IP security protocol (IPSec), or other protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

§2.0 Example Detailed System Architecture and Operation

Figure 2:
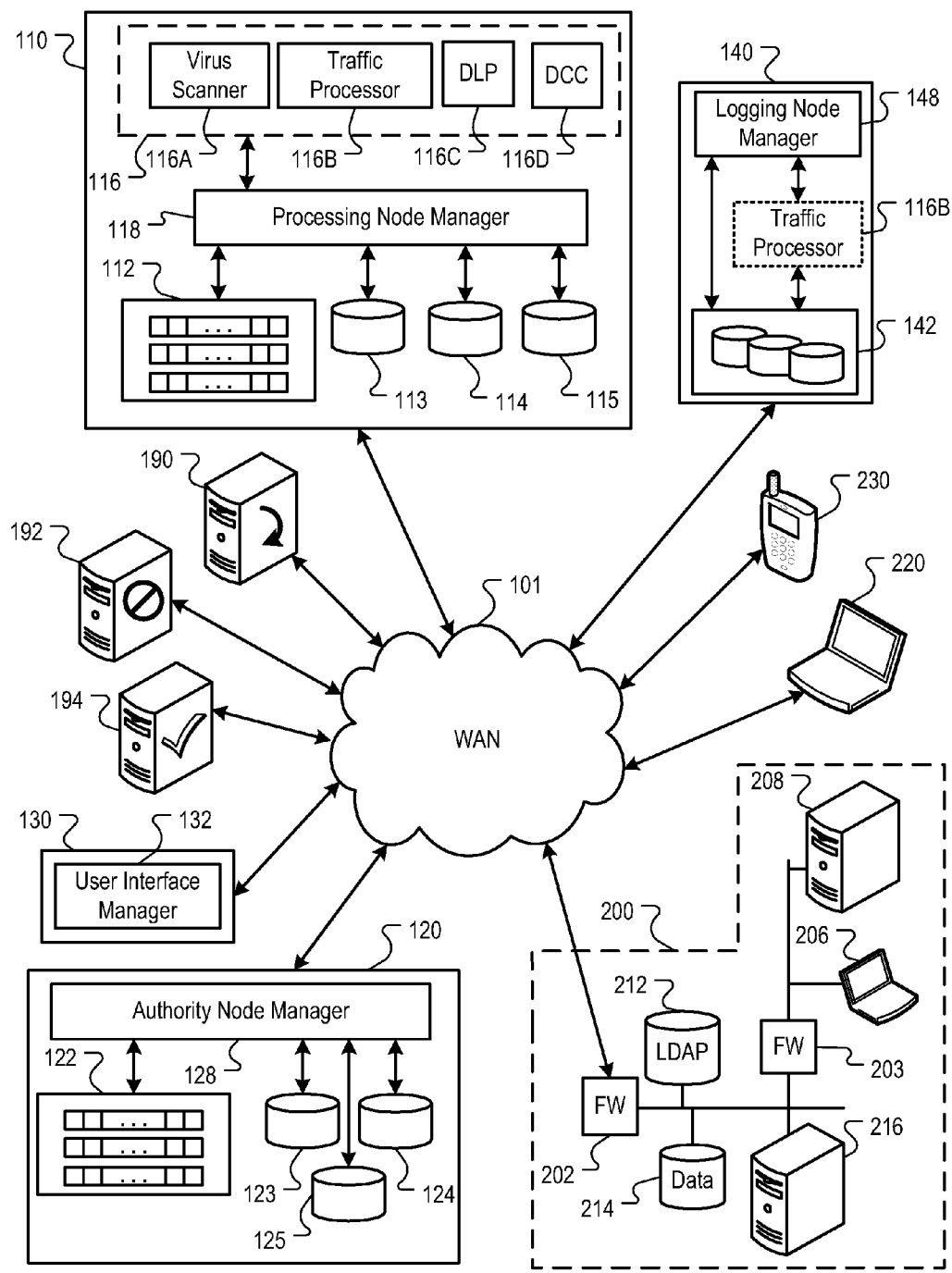
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 206 of the enterprise 200, or to some other secured data provider server.

Also shown in FIG. 2 are an example proxy server 190, and two other servers 192 and 194. The first server, server 192, is a server that the enterprise 200 desires that users within the enterprise 200 be unable to access, e.g., a known phishing site, Trojan source, or otherwise objectionable location, malicious location, or some other location that can cause harm or lower employee productivity. The second server, server 194, is a server that the enterprise 200 does not prohibit access to, e.g., a news service, a government site, and the like.

§2.1 Example Processing Node Architecture and Operation

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection. Additionally, each processing node 110 can also store traffic detection data 115 that can be used to facilitate the detection of embedded and/or encoded resource locator data.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a traffic processor 116B that can classify a resource requests, e.g., HTTP request or resource locations, as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the traffic processor 116B.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture and Operation

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and updated the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

The authority node 120 can also store master traffic detection data 125. The master traffic detection data 125 can be provided to the processing nodes 110 as the traffic detection data 115.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, the threat data 114 and/or 124, and the traffic detection data 115/125.

§2.4 Embedded Resource Request Identification and Processing

Often, resource requests, e.g., HTTP requests that include uniform resource identifiers (URIs), may include embedded resource locations. For example, an HTTP request issued by a web browser on a client device typically contains data that is used to designate a file or a dynamic resource on a remote server. However, the HTTP request is not limited to merely designating a file or a dynamic resource; the request can conceptually contain arbitrary data, the contents and applicability of this arbitrary data can widely vary.

One use for this arbitrary data is to include a secondary resource request identifier, e.g., a URI (which can be a URL), that serves to identify a different web address/location, such as the location of the prohibited server 192. The purpose of the embedded resource request identifier can vary; common uses can include the facilitation of advertising syndication, user tracking, and anonymous web surfing. Frequently the embedded resource request can be encoded. Common encoding schemes include Base64, Base32 and Base16 (ASCII-represented hexadecimal).

To detect anonymous web surfing, or maintain privacy against user tracking, or blocking unwanted advertising, the traffic processor 116B of a processing node 110 can detect embedded resource request identifiers in the multiple resource requests transmitted to and/or from a protected system, such as client devices in the enterprise 200, or the user devices 220 and 230.

In some implementations, various parts of the resource request are inspected for embedded resource request identifiers. For an example HTTP request, these parts include the URI path, generally referred to as "path parameters", the query string, generally referred to as "query parameters" or "query info" for the case of the entire query string, and the request body, generally referred to as "post parameters." Illustrated examples for the various locations for the values are listed below, with the location indicated by "value".

Path parameters: "GET/dir/app.cgi/value HTTP/1.0"
Query info: "GET /dir/app.cgi?value HTTP/1.0"
Query parameters: "GET /dir/app.cgi?key=value HTTP/1.0"
Post parameters:
"POST /dir/app.cgi HTTP/1.0
Content-Length: 8
Content-Type: application/x-www-form-urlencoded
key=value"

In some implementations, for each potential value found in the previously listed parts, the values are inspected to determine if the value begins with predetermined encoded prefix data. The predetermined prefix data can be stored in the traffic detection data 115, and can be received from the authority node 120. Since the resource request can be embedded and encoded, the traffic processor 116B can compare the data of the resource request to predetermined encoded prefix data that are each indicative of prefix data of an embedded resource request identifier. If the resource request is determined to include one of the plurality of predetermined encoded prefix data, then the traffic processor 116B decodes the encoded prefix data, and any encoded subsequent data that is contiguous with the encoded prefix data. The traffic processor 116B then determines if the decoded prefix data and subsequent data comprises an embedded resource request identifier. If so, the traffic processor 116B can log the decoded prefix data and subsequent data as a detected embedded resource request identifier, e.g., by sending a command to the logging node 140; or classify the embedded resource request identifier; and cause the processing node manager 118 to take subsequent actions, such as initiating one or more filtering operations based on the classification of the embedded resource request identifier.

For example, common prefixes for a resource request identifier include "http://", "https://" and "www." The encoded prefix data "aHR0cDov", "aHR0cHM6" and "d3d3" respectively represent the prefixes in Base64, while the encoded prefix data "687474703a2f2f", "68747470733a2f2f" and "7777772e" respectively represent the prefixes in Base16.

If the encoded prefix data are found for a value, then the traffic processor 116B can fully decode the encoded prefix data and subsequent data that is encoded according to the same scheme to ensure the value fits within the expected format of a resource location identifier. Example formats of resource location identifiers for uniform resource locators are defined in RFC 3986. Other resource location identifiers and formats can also be used.

Once the embedded resource request identifier is identified, one or more of the subsequent processes described in Section 2.5 below can be initiated.

In some implementations, the traffic processor 116B identifies the respective values in the path parameters, query parameters, and/or post parameters and compares the prefixes of these values to the predetermined encoded prefix data, e.g., "aHR0cDov", "aHR0cHM6" and "d3d3" for Base64, and "687474703a2f2f", "68747470733a2f2f" and "7777772e" for Base16. If the traffic processor 116B identifies a match in the data of the resource request, then the identified prefix data in the resource request, and any subsequently encoded data, is decoded by the traffic processor 116B according to the appropriate coding scheme, e.g., Base64, Base32, Base16, or some other coding scheme. If the traffic processor 116B determines that the value conforms to the known format, e.g., the format of a URI or URL, then the traffic processor 116B notifies the processing node manager 118 that an embedded resource request identifier has been identified. The processing node manager 118 can then initiate the subsequent processes described in Section 2.5 below.

In some implementations, the traffic processor 116B can, for HTTP requests, extract data and values according to the paths, path segments, and queries of the URI of the request. For example, the traffic processor 116B can extract the path of the HTTP request, separates the path into individual path segments, and apply a URI unescape algorithm to each individual path segment. Each resulting identified value can be compared to the predetermined encoded prefix data to determine whether the value is a signal of an encoded and embedded resource request identifier.

Likewise, for queries, the traffic processor 116B can extract the query of the HTTP request, and apply a URI unescape algorithm to the query. The resulting values are compared to the predetermined encoded prefix data to determine whether the value be a signal of an encoded and embedded resource request identifier.

Other processes for identifying values in an HTTP request, or other resource request, can also be used. In some implementations, the traffic processor 116B can determine a corresponding prefix window for each of the predetermined encoded prefix data and incrementally traverse a resource request with each corresponding prefix window. For each traversal, the traffic processor 116B can determine if each corresponding prefix window includes data matching its corresponding predetermined encoded prefix data for each incremental traversal.

For example, for the predetermined encoded prefix data "d3d3", a prefix window of four characters can be created. The prefix window is a circular buffer, and is used to traverse each identified request. For the following identified request http://exampleproxy.org/
index.php?q=d3d3LmV4YW1wbGUuY29t&hl=2ed
the prefix window is initially filled with "http". As this does not match the prefix data "d3d3," the identified request is incrementally traversed by the traffic processor 116B, and the window is updated to include "ttp:". Incrementing continues until the prefix window includes "d3d3", which is the encoded prefix data for "www.". As a result of the matching of the data in the prefix window matching the data for the Base64 encoded prefix of "www.", the traffic processor 116B decodes this prefix and the subsequently encoded data, i.e., "d3d3LmV4YW1wbGUuY29t." This decoding results in the URL "www.example.com."

In some implementations, more than one character can be incrementally traversed. For example, if none of the characters in a prefix window correspond to predetermined encoded prefix data, the prefix window can be fully advanced to another set of new characters. Furthermore, although only one prefix window was described, multiple prefix windows for different sets of encoded prefix data can be processed in parallel.

The traffic processor 116B is illustratively implemented in the processing node 110. In this implementation, the traffic processor 116B can monitor resource requests in real-time, and can instruct the processing node manager 118 to initiate one or more security processes in response to identifying an embedded resource request. In some implementations, the traffic processor 116B can be implemented in the logging node 140, and the logging node 140 can access the master traffic detection data 125 from the authority node 120 (or, alternatively, store a local copy of the traffic detection data 115). The logging node 140 can log resource requests, and other transactions, as log data 142 by use of a logging node manager 148. The security log data, however, can be readily accessed by the user interface front-end 130. For example, a user interface manager 132 can be used to generate log reports, execute security scenarios, monitor network traffic, etc. In these implementations, reports on embedded resource request, such as the number of embedded requests detected, the number of disallowed requests, and the users associated with the requests, can be provided by use of the traffic processor 116B.

§2.5 Anonymous Proxy Site Detection by Use of Embedded Resource Request

As previously described, there can be many uses for embedded resource requests. One use is the anonymous web surfing by use of a proxy server, e.g., proxy server 190. Thus, in some implementations, the traffic processor 116B and the processing node manager 118 can be use to detect anonymous proxy usage. For example, the enterprise may block the URL www.example.com, which is the URL associated with a server 192. Users may try to access the URL by use of the proxy server 190, e.g., the resulting request is:
http://exampleproxy.org/
index.php?q=d3d3LmV4YW1wbGUuY29t&hl=2ed
which includes the embedded and encoded resource request identifier "d3d3LmV4YW1wbGUuY29t". Upon being notified of the detection of an embedded resource request identifier by the traffic processor 116B, the traffic processor 116B can, in some implementations, compare the embedded resource request identifier to the policy data 113 to classify the embedded resource request identifier according to a security policy associated with a device to which the resource request identifier is addressed. Based on this classification, the processing node manager 118 can perform a filtering operation in response to the embedded resource request identifier.

Example filtering operations for embedded resource request identifiers that are classified as violating a policy can include removing the embedded resource request identifier from the resource request, and allowing the resource request to be transmitted to the server to which it is addressed; or precluding transmission of the resource request that includes the embedded resource request identifier; or substituting an alerting resource request identifier for the embedded resource request identifier. For the latter filtering process, the alerting resource request identifier can specify a resource request that causes alerting content to be provided to the client device to which the resource request is addressed. Example alerting content can be a warning page provided from the processing node 110; or some other content to make the user of the client device aware of the detection of the use of a proxy server and the violating embedded resource request.

In some implementations, the processing node manager 118 can block the HTTP request to the proxy server and issue and HTTP redirect response that directs the client device to the alerting content. In this implementation, traffic between the processing node 110 and the proxy server 190 is reduced, as requests that include restricted resource request identifiers are blocked from transmission to the proxy server 190.

In some implementations, the processing node manager 118 (or logging node manager 148, if mining logged data 142) can associate a user device with resource requests that are directed to or received from the user device. The processing node manager 118 (or logging node manager 148) can generate a blocking count for the user device, the blocking count being a count of filtering operations that resulted in preclusion of an embedded resource request identifier, i.e., the filtering of an embedded resource request identifier that is determined to violate an enterprise policy as defined by policy data 113. In some implementations, the processing node manager 118 (or logging node manager 148) can preclude all resource requests to a user device having an associated blocking count that exceeds a threshold count. Such measures can be implemented to guard against surreptitious programs hijacking a client device, or to restrict access from a user that is ignoring or abusing an enterprise's network policies, etc.

Other security processes can also be initiated by the processing node manager, such as sending an alert to one or more administrators or recording a log entry, to name just a few.

By initiating remedial or security processes based on the classification of an embedded resource request identifier, the authority node 118 still allows users to use a proxy server 190 for non-violating actions. For example, access to the server 194 may be allowed according to the policy data, and a user device accessing the server 194 directly or by use of the proxy server 190 does not result in a security policy violation. Thus, the processing node manager 118 and the traffic processor 116B can effectively preclude unauthorized access of anonymously proxied web sites, e.g., server 194, based on detecting when the user is trying to use an anonymous proxy web site to access a URL that is normally blocked. The processing node manager 118 and the traffic processor 116B can still allow a user to utilize an anonymous proxy web site to access a URL that the user is normally allowed to access.

§3.0 Example Processes

Figure 3:
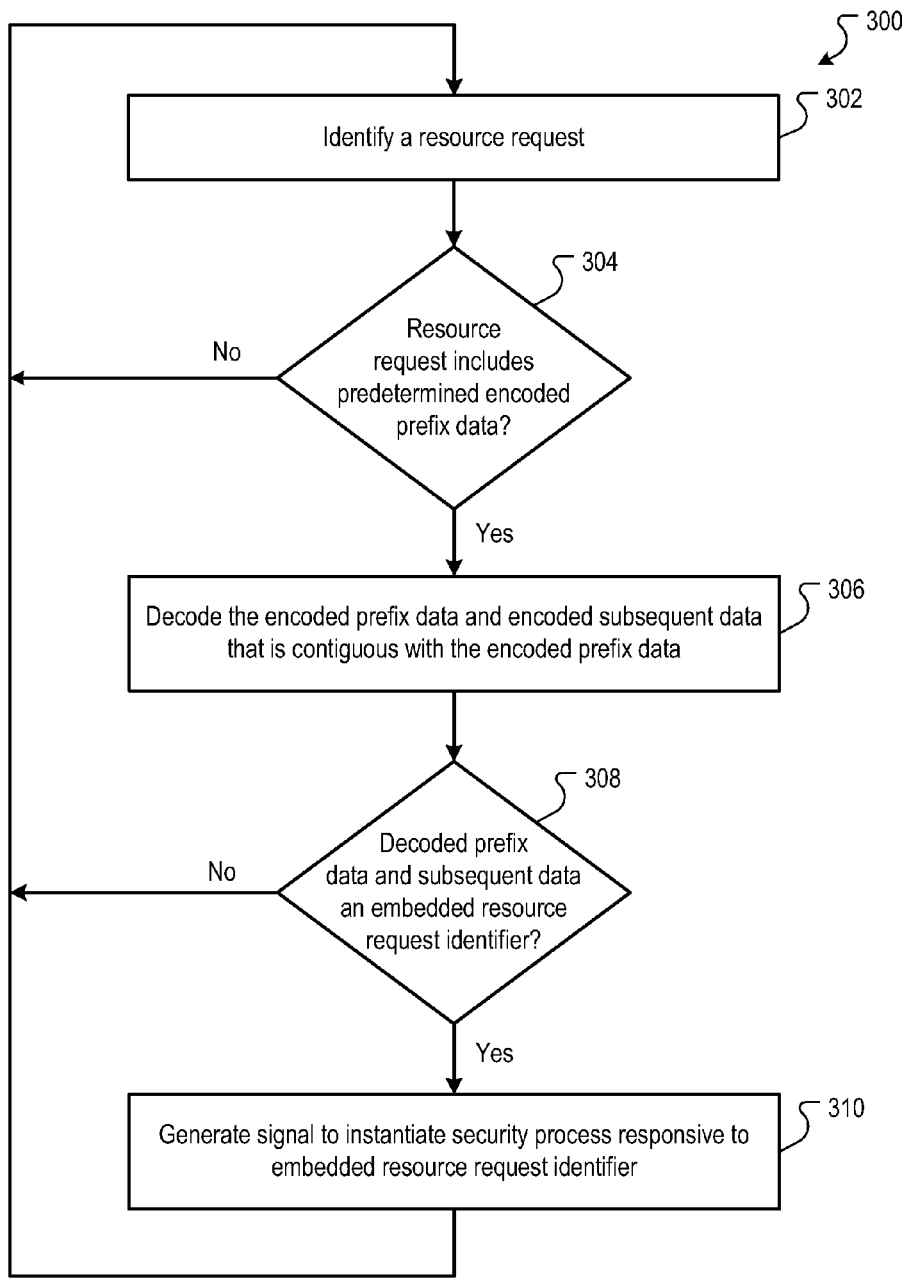
FIG. 3 is a flow diagram of an example process for detecting embedded resource request identifiers.

FIG. 3 is a flow diagram of an example 300 process for detecting embedded resource request identifiers. The process 300 can, for example, be used in the traffic processor 116B of FIG. 2 and can be used to monitor traffic in real time.

The process 300 identifies a resource request (302). For example, the traffic processor 116B can identify HTTP requests or response directed to client devices in an enterprise, such as the enterprise 200.

The process 300 determines if the resource request includes predetermined encoded prefix data (304). For example, the traffic processor 116B can determine if an HTTP request includes Base64 or Base16 encode data corresponding to "http:", "https:", or "www.".

If the process 300 determines that the resource request does not include predetermined encoded prefix data, then the process 300 identifies another resource request (302) and continues.

If the process 300 determines that the resource request does include predetermined encoded prefix data, then the process 300 decodes the encoded prefix data and encoded subsequent data that is contiguous with the encoded prefix data (306). For example, the traffic processor 116B can decode the data "d3d3LmV4YW1wbGUuY29t" in response to identifying the prefix data "d3d3."

The process 300 determines if the decoded prefix data and subsequent data are an embedded resource request identifier (308). For example, the traffic processor 116B can determine if the data "www.example.com", which is decoded from "d3d3LmV4YW1wbGUuY29t", is a URL.

If the process 300 determines that that the decoded prefix data and subsequent data are not embedded resources request identifiers, then the process 300 identifies another resource request (302) and continues.

If the process 300 determines that the decoded prefix data and subsequent data are an embedded resource request identifier, such as the case for "www.example.com", then the process 300 generates a signal to instantiate a security process responsive to the embedded resource request identifier (310). For example, the traffic processor 116B can classify the embedded resource request identifier and pass the embedded resource request identifier and a notification of the identifier to the processing node manager 118, which can, in turn, compare the embedded resource request identifier to the policy data 113 and take any necessary actions.

Figure 4:
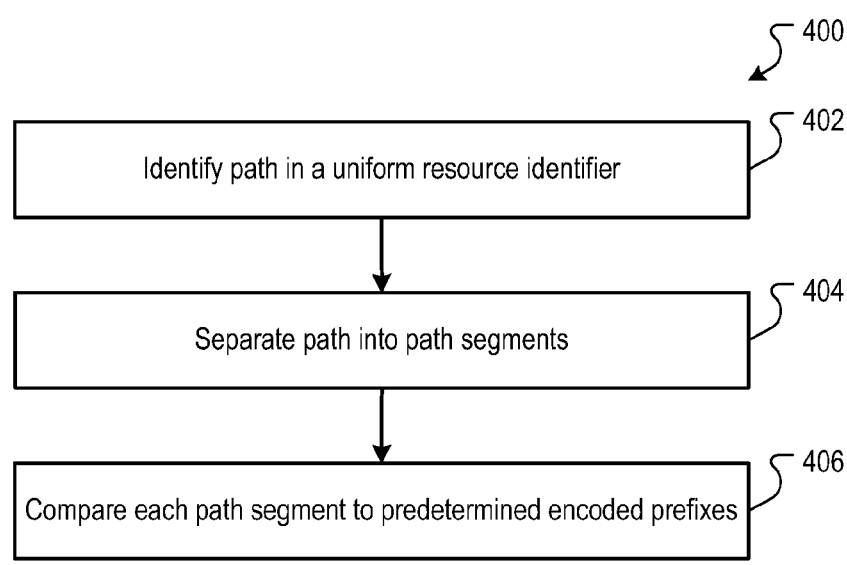
FIG. 4 is a flow diagram of another example process for detecting embedded resource request identifiers.

FIG. 4 is a flow diagram of another example process for detecting embedded resource request identifiers. The process 300 can, for example, be used in the traffic processor 116B of FIG. 2.

The process 400 identifies a path of the uniform resource identifier (402). For example, the traffic processor 116B can identify a path in a URL.

The process 400 separates path into segments (404). For example, the traffic processor 116B can separate the path of the URL into path segments according to standard HTTP parsing protocols.

The process 400 compares each path segment to predetermined encoded prefixes (406). For example, the traffic processor 116B can compare each path segment to the Base64 or Base16 encode data corresponding to "http:", "https:", or "www."

Figure 5:
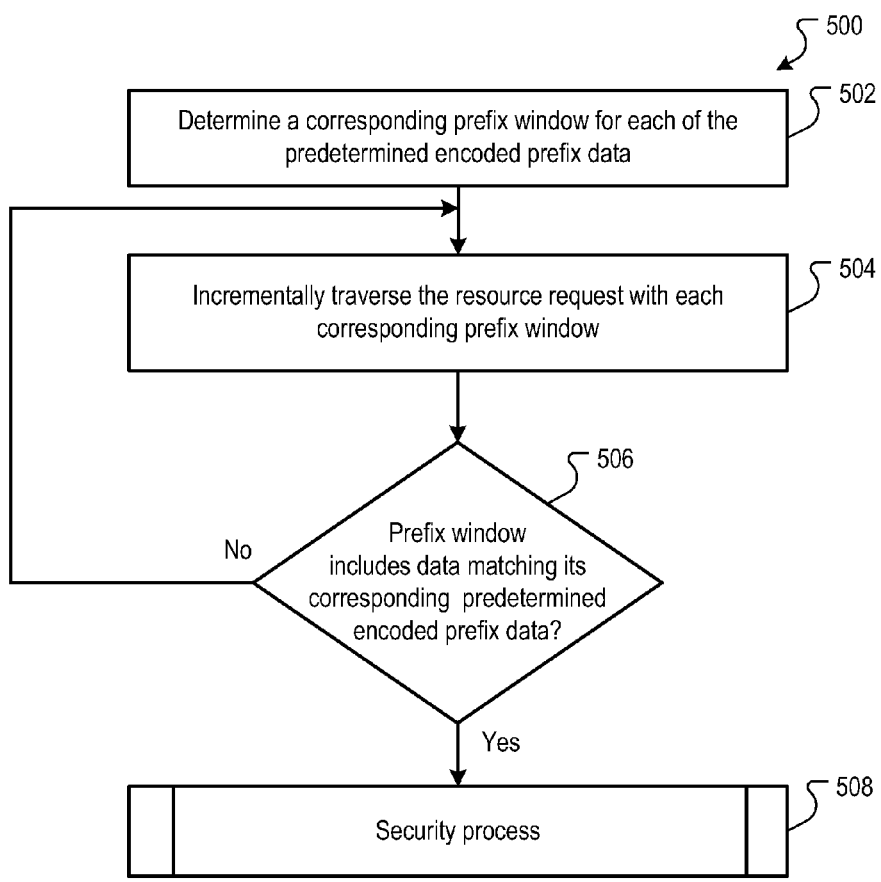
FIG. 5 is a flow diagram of another example process for detecting embedded resource request identifiers.

FIG. 5 is a flow diagram of another example process for detecting embedded resource request identifiers. The process 300 can, for example, be used in the traffic processor 116B and the processing node manager 118 of FIG. 2.

The process 500 determines a corresponding prefix window for each of the predetermined encoded prefix data (502).

For example, the traffic processor 116B can generate a prefix window of four characters for the predetermined encoded prefix data of "d3d3".

The process 500 incrementally traverses the resource request with each corresponding prefix window (504). For example, the traffic processor 116B can incrementally traverse the resource request
http://exampleproxy.org/
index.php?q=d3d3LmV4YW1wbGUuY29t&hl=2ed
filling and emptying the prefix window in the manner of a circular buffer.

The process 500 determines if the prefix window includes data matching its corresponding predetermined encoded prefix data (506). For example, the traffic processor 116B can determine if the prefix window includes the data "d3d3".

If the process 500 does determines that the prefix window does not include data matching its corresponding predetermined encoded prefix data, then the process 500 traverses the resource request for another increment and repeats.

If the process 500 determines the prefix window does include data matching its corresponding predetermined encoded prefix data, then the process 500 can initiate a detection process (508). For example, the traffic processor 116B can decode the prefix data and subsequently encoded data, classify the decoded data, and pass the decoded data to the authority node manager 118. The authority node manager 118 can compare the decoded data to the policy data 113. Based on the comparison, the authority node 118 can instantiate one or more filtering operations.

Figure 6:
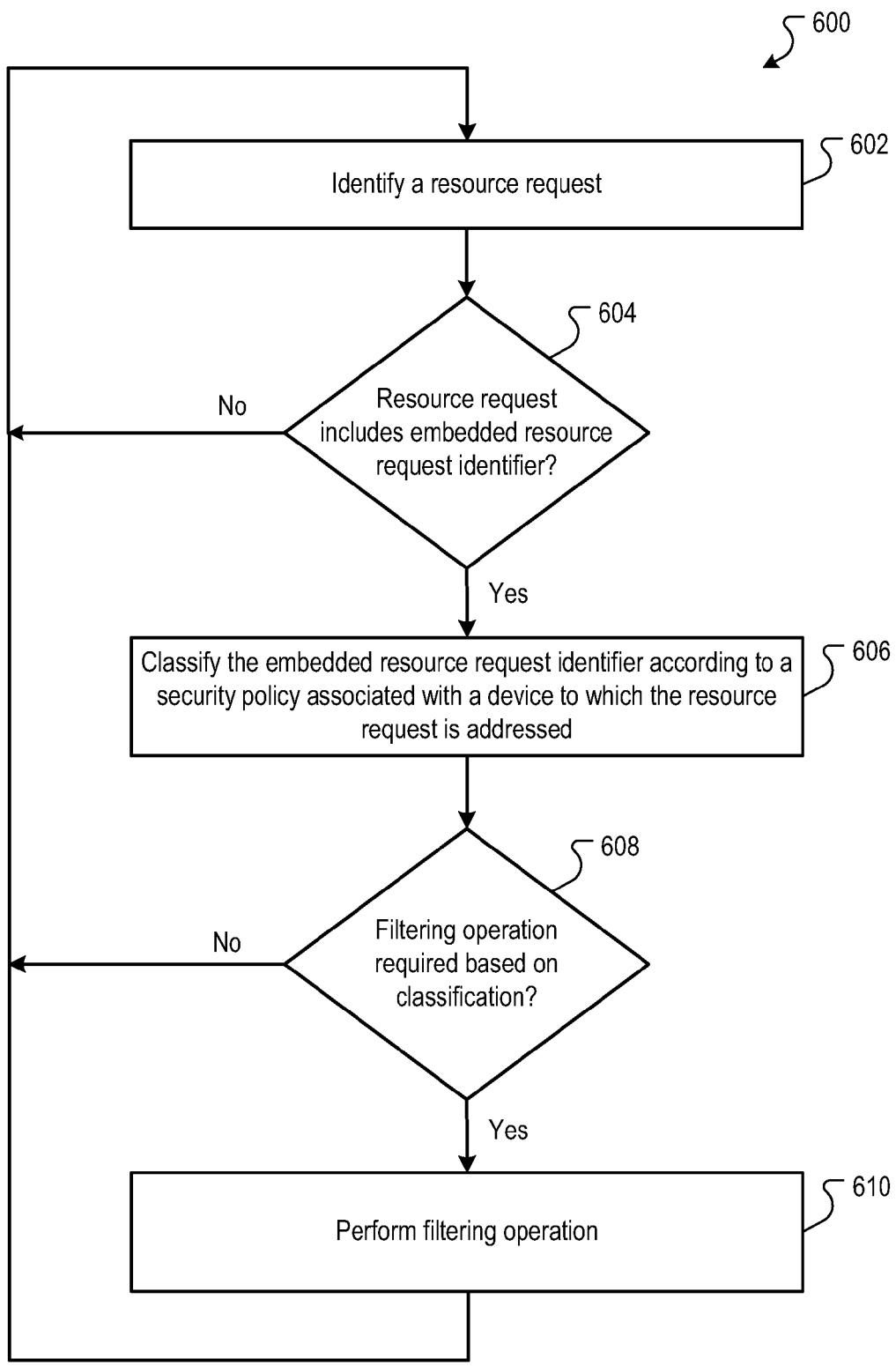
FIG. 6 is a flow diagram of an example process for handling detected embedded resource request identifiers.

FIG. 6 is a flow diagram of an example process for handling detected embedded resource request identifiers. The process 300 can, for example, be used in the traffic processor 116B and the processing node manager 118 of FIG. 2.

The process 600 identifies a resource request (602). For example, the traffic processor 116B can identify HTTP requests received at the processing node 110.

The process 600 determines if the resources request includes an embedded resource request identifier (604). For example, the traffic processor 116B can determine if the resource request includes an embedded URL as described above.

If the process 600 does determine that the resource request does not include an embedded resource request identifier, then the process 600 identifies another resource request (602) and continues.

If the process 600 determines that the resource request does include an embedded resource request identifier, then the process 600 classifies the embedded resource request identifier according to a security policy associated with a device to which the resource request is addressed (606). For example, the traffic processor 116B can classify the embedded URL as either allowed or precluded, depending on the security policy data 113 associated with a receiving device.

The process 600 determines if a filtering operation is required based on classification (608). For example, the authority node manager 118 can perform no filtering operations on requests that include allowed embedded URLs, and, conversely, perform filtering operations on requests that include precluded embedded URLs.

If the process 600 does not determine a filtering operation is required based on classification, then the process 600 identifies another resource request (602) and continues.

If the process 600 determines that a filtering operation is required based on classification, then the process 600 performs the filtering operation (610). For example, the authority node manager 118 can remove the embedded resource request identifier from the resource request; preclude transmission of the resource request that includes the embedded resource request identifier; or substitute an alerting resource request identifier for the embedded resource request identifier.

The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network, such as the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying resource requests with a distributed security system external to addressed receiving devices and external to addressed transmitting devices of the resource requests implemented as an overlay network;
for each of the identified resource requests:
determining the resource request includes one of a plurality of predetermined encoded prefix data, each of the predetermined encoded prefix data being indicative of prefix data of an embedded resource request identifier associated with an address of an anonymous proxy server;
when the resource request is determined to include one of the plurality of predetermined encoded prefix data, decoding the encoded prefix data and encoded subsequent data that is contiguous with the encoded prefix data and encoded according to an encoding scheme of the encoded prefix data;
determining the decoded prefix data and subsequent data comprises an embedded resource request identifier; and
when the decoded prefix data and subsequent data comprises an embedded resource request identifier, generating a security notification to instantiate a security process responsive to the embedded resource request identifier.

2. The method of claim 1, wherein identifying resource requests comprises identifying uniform resource identifiers.

3. The method of claim 2, wherein determining if the resource request include one of a plurality of predetermined encoded prefix data comprises determining if the resource request includes one of a plurality of predetermined encoded prefix data in a path segment of the uniform resource identifier.

4. The method of claim 3, wherein determining if the resource request includes one of a plurality of predetermined encoded prefix data in a path segment of the uniform resource identifier comprises:
extracting the path of the uniform resource identifier;
separating the path into path segments; and
comparing each path segment to the predetermined encoded prefix data.

5. The method of claim 2, wherein determining if the resource request include one of a plurality of predetermined encoded prefix data comprises determining if the resource request includes one of a plurality of predetermined encoded prefix data in a query parameter of the uniform resource identifier.

6. The method of claim 5, wherein determining if the resource request includes one of a plurality of predetermined encoded prefix data in a query parameter of the uniform resource identifier comprises:
extracting query parameter values from the query; and
comparing each query parameter value to the predetermined encoded prefix data.

7. The method of claim 1, wherein the resource request is an HTTP request, and wherein determining if the resource request include one of a plurality of predetermined encoded prefix data comprises determining if the resource request includes one of a plurality of predetermined encoded prefix data in a message body of the resource request.

8. The method of claim 7, wherein determining if the resource request includes one of a plurality of predetermined encoded prefix data in the message body comprises:
extracting parameter values from the message body based on a message body format indicated in the HTTP request; and
comparing each parameter value to the predetermined encoded prefix data.

9. The method of claim 2, wherein the encoding scheme is one or more of a Base64 encoding scheme, Base32 encoding scheme, or Base16 encoding scheme.

10. The method of claim 2, wherein:
identifying resource requests comprises identifying HTTP requests; and
wherein the embedded resource request identifier comprises a uniform resource locator.

11. The method of claim 1, wherein determining if the resource request includes one of a plurality of predetermined encoded prefix data comprises:
determining a corresponding prefix window for each of the predetermined encoded prefix data;
incrementally traversing the resource request with each corresponding prefix window; and
determining if each correspond prefix window includes data matching its corresponding predetermined encoded prefix data for each incremental traversal.

12. The method of claim 1, wherein identifying resource requests external to addressed receiving devices and addressed transmitting devices of the resource requests comprises identifying resource requests stored in traffic logs for an enterprise.

13. The method of claim 1, wherein the security process comprises logging the decoded prefix data and subsequent data as a detected embedded resource request identifier.

14. A network security system, comprising:
a plurality of nodes, each comprising one or more servers comprising memory, forming a distributed security system external to network edges of an external system and a wide area network implemented as an overlay network, each node comprising:
a traffic processor implemented as a computer program on the one or more servers configured to:
identify resource requests in data traffic between the external system and the wide area network;
determine an identified resource request includes one of a plurality of predetermined encoded prefix data, each of the predetermined encoded prefix data being indicative of prefix data of an embedded resource request identifier associated with an address of an anonymous proxy server;
when the resource request is determined to include one of the plurality of predetermined encoded prefix data, decode the encoded prefix data and encoded subsequent data that is contiguous with the encoded prefix data and encoded according to an encoding scheme of the encoded prefix data;
determine the decoded prefix data and subsequent data comprises an embedded resource request identifier; and
when the decoded prefix data and subsequent data comprises an embedded resource request identifier, log the decoded prefix data and subsequent data as a detected embedded resource request identifier.

15. The system of claim 14, wherein the resource requests comprise uniform resource identifiers.

16. The system of claim 15, wherein the embedded resource request identifier detector is further configured to determine if the resource request includes one of a plurality of predetermined encoded prefix data in a path parameter of the uniform resource identifier.

17. The system of claim 16, wherein the embedded resource request identifier detector is further configured to:
extract the path of the uniform resource identifier;
separate the path into path segments; and
compare each path segment to the predetermined encoded prefix data.

18. The system of claim 15, wherein the embedded resource request detector is further configured to:
extract query parameter values in the resource request from the query in the resource request; and
compare each query parameter value to the predetermined encoded prefix data.

19. The system of claim 15, wherein the encoding scheme is one or more of a Base64 encoding scheme, Base32 encoding scheme, or Base16 encoding scheme.

20. The system of claim 15, wherein the resource requests comprise HTTP requests, and wherein the embedded resource request identifier comprises a uniform resource locator.

21. The system of claim 14, wherein the embedded resource request detector is further configured to:
determine a corresponding prefix window for each of the predetermined encoded prefix data;
incrementally traverse the resource request with each corresponding prefix window; and
determine if each correspond prefix window includes data matching its corresponding predetermined encoded prefix data for each incremental traversal.

22. Software stored in a non-transitory computer readable medium and comprising instructions executable by a processing system and upon such execution cause the processing system to perform operations comprising:
identifying resource requests, wherein the processing system comprises a distributed security system external to addressed receiving devices and addressed transmitting devices of the resource requests implemented as an overlay network;
for each of the identified resource requests:
determining the resource request include one of a plurality of predetermined encoded prefix data, each of the predetermined encoded prefix data being indicative of prefix data of an embedded resource request identifier associated with an address of an anonymous proxy server;
when the resource request is determined to include one of the plurality of predetermined encoded prefix data, decoding the encoded prefix data and encoded subsequent data that is contiguous with the encoded prefix data and encoded according to an encoding scheme of the encoded prefix data;
determining the decoded prefix data and subsequent data comprises an embedded resource request identifier; and
when the decoded prefix data and subsequent data comprises an embedded resource request identifier, logging the decoded prefix data and subsequent data as a detected embedded resource request identifier.

\* \* \* \* \*